United States Patent [19]

Nishikado et al.

[11] Patent Number: 5,655,073
[45] Date of Patent: Aug. 5, 1997

[54] DEBUGGING METHOD AND DEBUGGER

[75] Inventors: Takashi Nishikado, Ebina; Nobuo Yamamoto; Fujio Fujita, both of Yokohama, all of Japan

[73] Assignee: Hitachi, Ltd., Tokyo, Japan

[21] Appl. No.: 492,978

[22] Filed: Jun. 21, 1995

[30] Foreign Application Priority Data

Jun. 22, 1994 [JP] Japan ................................. 6-139945

[51] Int. Cl.$^6$ .................................................. G06F 11/00
[52] U.S. Cl. ...................... 395/183.14; 395/601; 395/701
[58] Field of Search ........................ 395/183.14, 500, 395/700, 650, 600

[56] References Cited

U.S. PATENT DOCUMENTS

| | | | |
|---|---|---|---|
| 5,371,746 | 12/1994 | Yamashita et al. | 395/183.14 |
| 5,379,301 | 1/1995 | Sato et al. | 395/183.14 |
| 5,394,544 | 2/1995 | Motoyama et al. | 395/183.14 |
| 5,426,648 | 6/1995 | Mamura | 395/183.14 |
| 5,455,936 | 10/1995 | Maemura | 395/183.14 |

Primary Examiner—Robert W. Beausoliel, Jr.
Assistant Examiner—Ly V. Hua
Attorney, Agent, or Firm—Antonelli, Terry, Stout & Kraus, LLP

[57] ABSTRACT

In an information processing debugging apparatus, a debugger owns a debug information adding element and a data with type access instructing element. The debug information adding element gives data type symbol information of a data type from a debug information object file to be used by an information processing program in a program object file to be debugged. The typed data access instructing element instructs an access operation by using a variable symbol of the information process program and an added data type symbol information as a variable having a data type where an operator designates a variable of the information program. Such an information processing program which is not formed by a debug option is symbolically debugged without increasing the memory capacity. A practical information processing program such as a library which is not directly related to debugging operation can also be symbolically debugged.

20 Claims, 12 Drawing Sheets

DEBUGGING METHOD AND DEBUGGER

BACKGROUND OF THE INVENTION

The present invention generally relates to a debugging method and a debugger for an information processing program. More specifically, the present invention is directed to an information processing method and a debugger for effectively debugging a program object file which has been compiled without using a debug option.

Conventionally, the symbolic debugging method for a high level programming language program is known in the art. The debugger is described in "acm computing surveys" by C. E. McDowell and D. P. Helmbold, vol 17–21, 1985–1989, The Survey and Tutorial Journal of the ACM, pages 593 to 630. Further, the compile technique with employment of the -g option as the compile/debug option is explained in "UNIX System V Programmer Guide Release 3.1" issued by AT&T unix pacifics, translated into Japanese by Nippon Soft Bank, pages 772 to 785.

As represented in FIG. 1, an operator 9 indicates a symbolic operation, namely a variable name, a function name, a type name and the like contained in a source program to debug an information processing program 11 in such an arrangement that a debugger 13 refers to such a program object file or an executable file 12p obtained by compiling using a debug option, (for instance, "-g option" described in the above publication) from the information processing program. That is, the program object file 12p to be debugged obtained by compiling using the debug option contains the debug symbol information 20 including information 24 related to a data type of a symbol, which causes a heavy memory load. The heavy memory load is caused by having to store the data type information 23 of the respective function/variable symbols, the name/size of the defined data in addition to the function/variable symbol name information 21 and the address information 22 with respect to the respective functions and variables of this information process program 11, and, when the data type has structured data, structured subfield information. Moreover, since all of the information contained in the source program is embedded in the object program, there is another problem in view of information security. It should be understood that the debug symbol information has no relation to the execution of the program, but corresponds to auxiliary information used for the debugging operation.

Although a program object file compiled without using a debug option has the symbols and the addresses as shown in FIG. 1, this program object file does not have the data type information 23 and the data type symbol information 24 of functions and variables. As a result, there is a further problem that, for instance, structured data in C language cannot be symbolically accessed.

SUMMARY OF THE INVENTION

An object of the present invention is to provide a symbolic accessing method capable of symbolically accessing structured data in an object information processing program which is obtained by compiling without a debug option.

A further object of the present invention is to provide a debugger capable of symbolic debugging both of a program and a library which is added to the program complied by using the debug option.

An information processing program debugging apparatus for debugging an information program, according to the present invention, includes:

a processor for processing data in accordance with instructions or an information processing program;

a memory connected to the processor and including an information processing program and a plurality of functions to debug the information processing program; and a disk storage connected to the memory and the processor, and including a program object file containing an executable object program corresponding to the information processing program, a symbol name and address information, which are referred to by the debugger.

The debugger includes debug information adding element for causing data type symbol information for debugging the information processing program to be stored in the disk storage.

The disk storage includes a debug information object file d containing the data type symbol information for debugging the information processing program.

The debugger further includes data access instructing element for instructing an access to the information processing program during the debugging operation of the information processing program with reference to the symbol name of the information processing program and the data type symbol information thereof.

The above-described access instructing element of the debugger includes a table containing a correspondence relationship between a plurality of symbol names and a plurality of symbol information.

The above-mentioned information processing debugging apparatus includes a terminal unit for transferring to the debugger an instruction concerning a symbol name and a symbol information issued from an operator; and the access instructing element of the debugger includes data type attribute information setting element for setting data type attribute information to the table in response to the symbol name and the data type name entered via the terminal unit. The data type attribute information corresponds to the symbol name and the data type name.

The access instructing apparatus may further include:

elements for translating the data type name stored within the table into a size of the data type to be stored into the table;

An element for translating a field of a data type into an offset value of a data type to be stored into the table; and An element for translating the symbol name in the information processing program into an address value corresponding thereto, so that an address for accessing the information processing program can be calculated.

In an information processing debugging apparatus including a processor, a memory having a debugger, and a disk storage having a file, a method for obtaining debug symbol information within an information processing program compiled without using a debug option, according to the present invention, includes:

a file preparing step for preparing, in the disk storage, a program object file containing an executable object program corresponding to the information processing program within the memory, a symbol name and address information, which are referred by the debugger;

a symbol information preparing step for holding data type symbol information used to debug the information processing program into at least one debug information object file prepared within the disk storage; and an access instructing step for instructing an access to the information processing program during the debugging operation of the object program with reference to the symbol name and the data type symbol information of the information processing program.

Further, one debug information object file and the program object file are designated in the combining form, so that a symbolic debugging operation to the symbol information within the information process program can be performed while the information processing program is debugged by the debugger.

It is preferable to employ a step for providing within the debugger, a table containing a correspondence relationship between a plurality of symbol names and a plurality of symbol information within the information process program.

It is possible to prepare the above-described information processing program and a file for a library to be merged in the disk storage.

Entries are given with respect to the plurality of symbol information contained in the table and a list indicative of a sequence along which symbols are referred is given, so that a symbol name corresponding to one referred symbol of said symbol information is employed to carry out said debugging operation.

The debug information object file containing the data type symbol information can be formed by compiling the source file written in this data type definition with the debug option. As a result, even when the program object file of the information processing program to be debugged contains no data type symbol information, the necessary data type symbol information can be obtained by adding and referring to the debug symbol information of either one, or plural separate object files containing the symbol information for the data type. While using the variable symbol of the information processing program and the added symbol of the data, such an instruction is made that the variable of the information processing program is accessed as such a variable having the designated data type. Accordingly, even when the program object file does not contain the data type information of the respective functions/variables, since the operator can instruct the debugger to perform the access operation as the data of the designated type by combining the added type symbols and the variable symbols, the data of the information processing program can be symbolically accessed.

BRIEF DESCRIPTION OF THE DRAWINGS

The present invention will be apparent from the detailed description to be read in conjunction with the accompanying drawings, in which.

DESCRIPTION OF THE PREFERRED EMBODIMENTS

An embodiment of the present invention will now be described.

Figure 2:
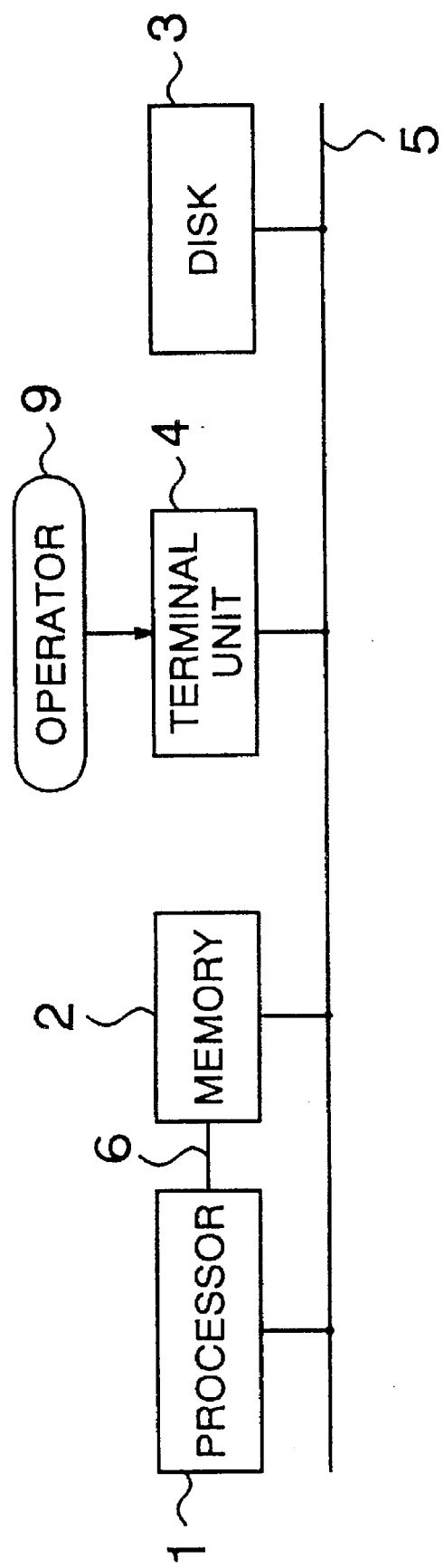
FIG. 2 schematically shows a system arrangement according to the present invention.

FIG. 2 schematically shows a relationship among the respective structural elements in a system for embodying the present invention. As illustrated in this drawing, an entire system includes a processor 1 for performing an information processing operation, a memory 2 for storing therein various information, a disk 3 capable of storing a large capacity of information, a terminal unit 4 operated by an operator 9, and a signal line 5 for connecting these structural elements with each other. It should be noted that although such a connection arrangement is shown by which DMA data may be transferred from the disk 3 via the signal line 5 to the memory 2, this connection arrangement is not necessarily required. An information processing program 11 and a debugger 13 are stored in the memory 2, and are sent via the a bus 6 to the processor 1 so as to execute the necessary processings.

Both of a program object file 12p (see FIG. 3) containing an information process source program executable code 11p and debug symbol information 20p for debugging, and a debug information object file 12d containing type symbol information for debugging have been stored in the disk 3.

The debugger 13 stored in the memory 2 realizes a symbolic debugging process in such a manner that this debugger 13 receives a debugging operation request issued from the operator 9 via the signal line 5, and accesses the information processing program 11p to be debugged while referring to the program object file 12p and the debug information object file 12d. The debug information object file 12d is compiled with -g option.

Figure 3:
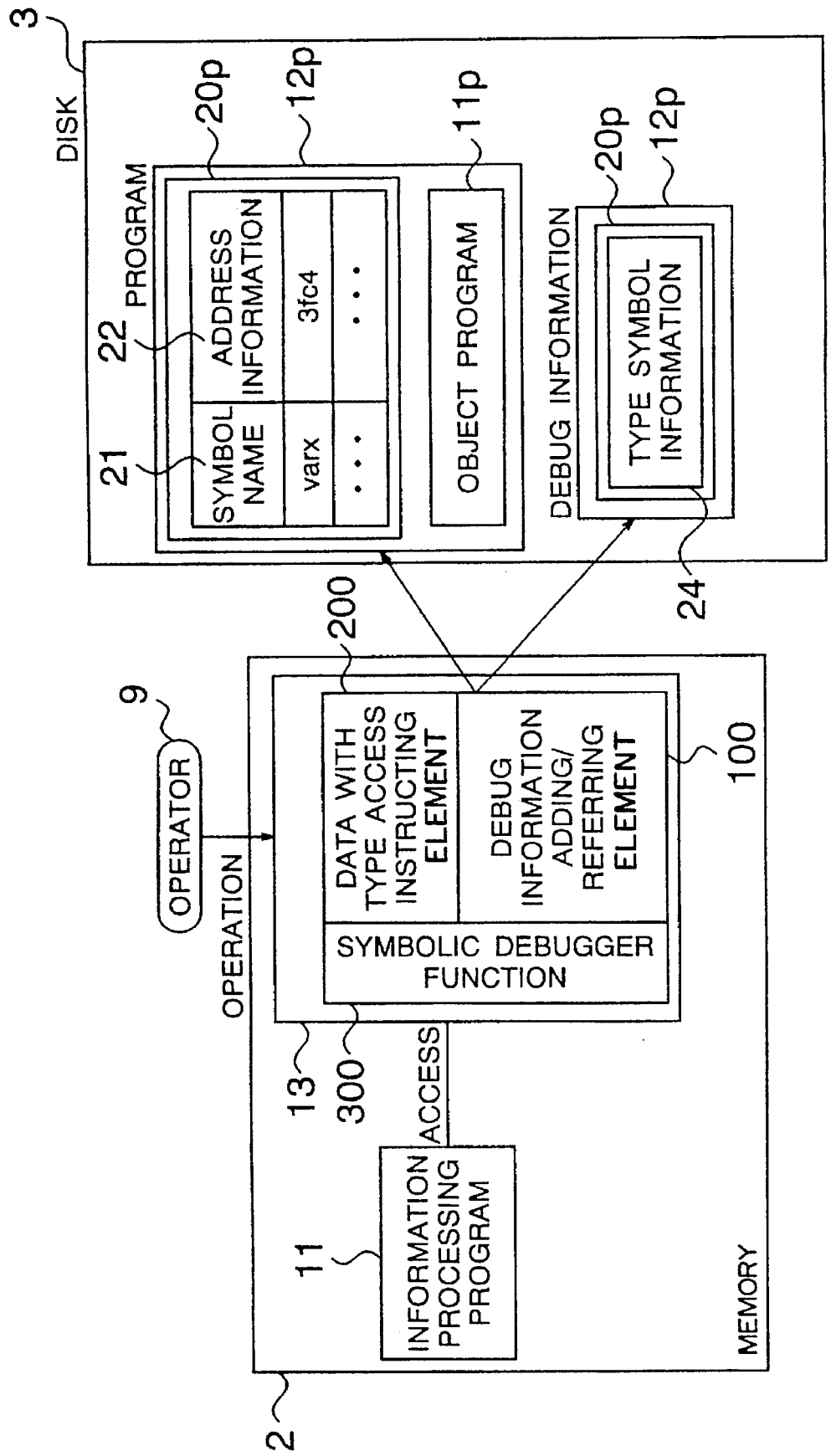
FIG. 3 is a conceptual diagram for indicating a debugging method according to an embodiment of the present invention.

Referring now to FIG. 3, the debugger and the debugging method, according to the present invention, will be explained more in detail.

First, the following featured points should be understood. That is, the debugger 13 refers to not only the content of the program object file 12p, but also the content of the debug information object file 12d. Further, in addition to the normal (ordinary) symbolic debugger function 300, both of a debug information adding element 100 and a data access instructing element 200 with the type are additionally provided with the debugger 13.

Figure 1:
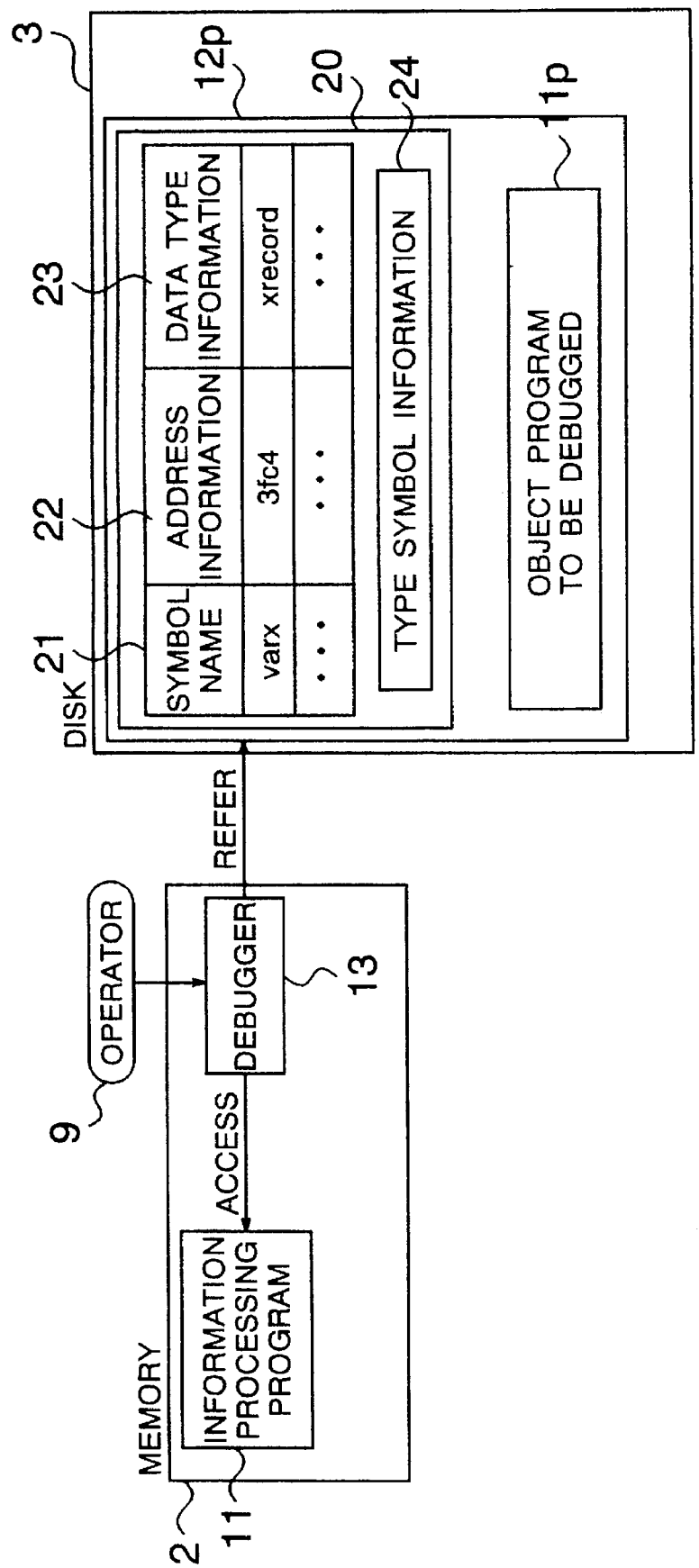
FIG. 1 conceptually represents the ordinary debugging method.

According to the present invention, since the information processing program which has been formed without attaching the debug option is debugged, it is sufficient if symbol name information 21 such as various functions and variables, and address information 22 for the information processing program are contained, as shown in FIG. 3, in the debug symbol information 20p contained in the program object file 12p. In other words, the data type information 23 such as the various functions and the variables, and the data type symbol information 24 used in this information processing program, which are contained in the conventional debug method with the debug option, are no longer contained. For instance, in FIG. 1 and FIG. 3, there are represented an example of a variable "varx" such that a structured data type "xrecord" having two 4-bit integer type fields is of a type as one example of the debug symbol information 20, or 20p. In the arrangement of FIG. 1, "varx", "3fc4" and "xrecord" have been stored in the debug symbol information 20 of the program object file 12p as the symbol name 21, the address information 22, and the data type information 23 of this variable. To the contrary, in the debug symbol information 20p of the program object file 12p according to the present invention, only "varx" of the symbol name 21 and "3fc4" of the address information are present, and no data type information is present.

Figure 4:
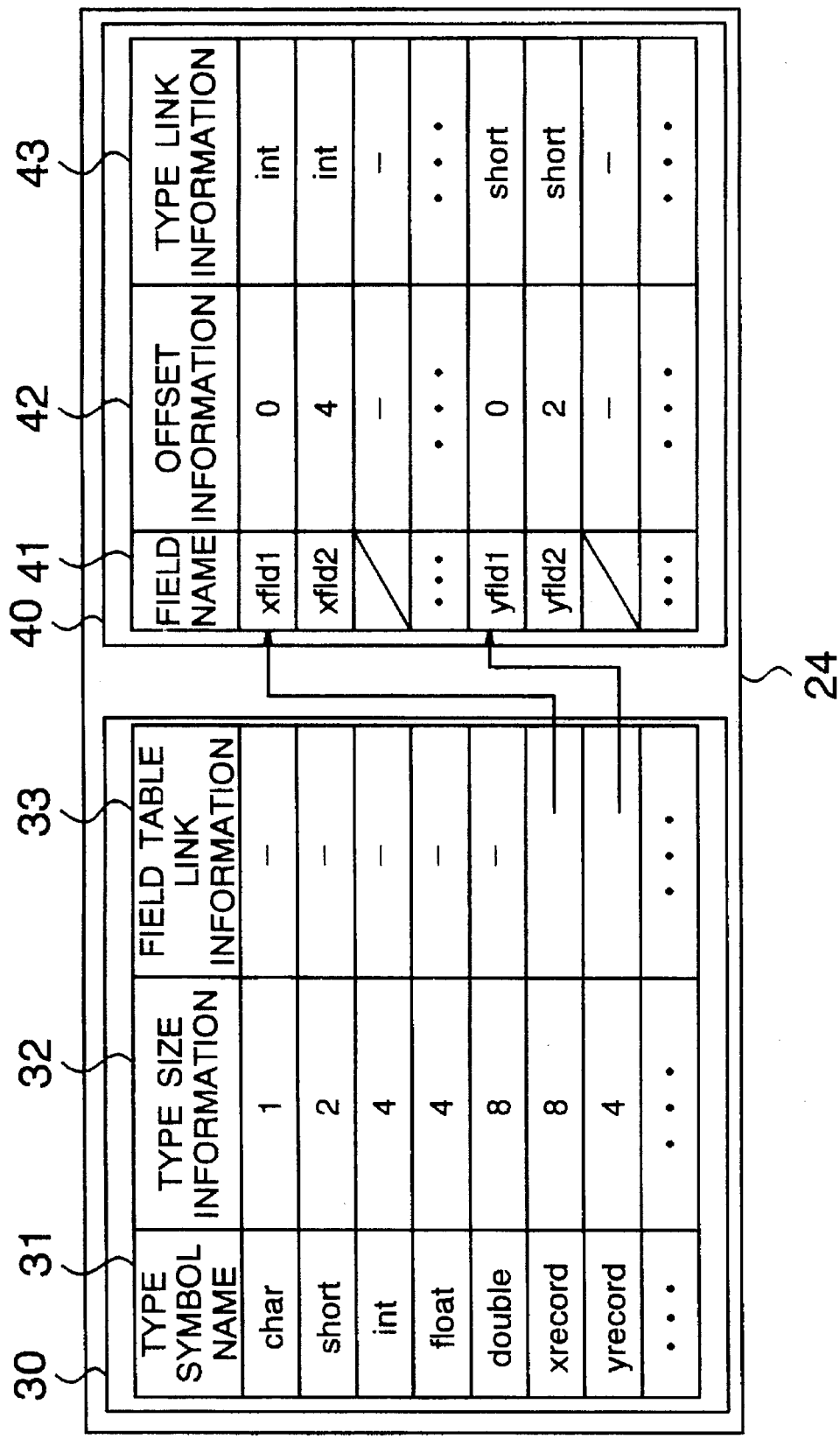
FIG. 4 schematically shows an arrangement diagram of debug symbol information of a type symbol according to the present invention.

In accordance with the present invention, the operator inputs the name of the debug information object file 12d containing the necessary data symbol information 24 into the debug information adding element 100 mainly added to the debugger 13. The debug information adding element 100 instructed by the operator 9 holds the data type symbol information 24 within this file 12d. In this way, the debugger 13 can refer to this data type symbol information. As illustrated in FIG. 4, the type symbol information 24 has a type symbol table 30 for each of data type symbols, and a field information table 40 indicative of data type of structured subfield information. The former-mentioned type symbol table 30 is constructed of a type symbol name 31, size information 32 of a data type, and furthermore link information 33 used to a field information table 40 when this data type owns the structure. The latter-mentioned field information 40 is constructed of a field name 41 within a data structure, offset information 42 for indicating a position of this field within the data structure, and link information 43 used to the data symbol table 30 so as to indicate the data type of this field. As reference information in FIG. 4, there is shown an example of the structured data type "rrecord" having two 4-bit integer type fields "xfield 1" and "xfield 2".

However, even when the above-described debug information adding element 100 is operated, such data type information 23 as the various functions and the variables is lacked to perform the symbolic access such as the variable data. Thus, a element 200 for instructing information required to access data with a type to the debugger 13 is newly added to this debugger 13, so that this lack of data type information may be supplemented. This data with type access instructing element 200 corresponds to such an element provided in order that an operator instructs to access the variable region of the information process program 11 based on the information instructed by the instructing element 200 with employment of the symbol names of the functions and variables obtained from the program object file 12p, and also the type symbol name and the field name obtained from the debug information object file 12d.

In accordance with the present invention, a lack of various information of the program object file 12p which has not been formed by the debug option can be supplemented, so that the symbolic debugging equivalent to the conventional symbolic debugging can be realized. It should be noted that although only one debug information object file is illustrated in FIG. 3 for the sake of simplicity, a plurality of object files may be employed. Also, when a shared library or the like is used, there is such a case that a plurality of program object files are provided.

Since the debugger 13 according to the present invention has been summarized, concrete examples of the two newly added elements, i.e., debug information adding element 100 and data with type access instructing element 200 will now be described more in detail.

Figure 5:
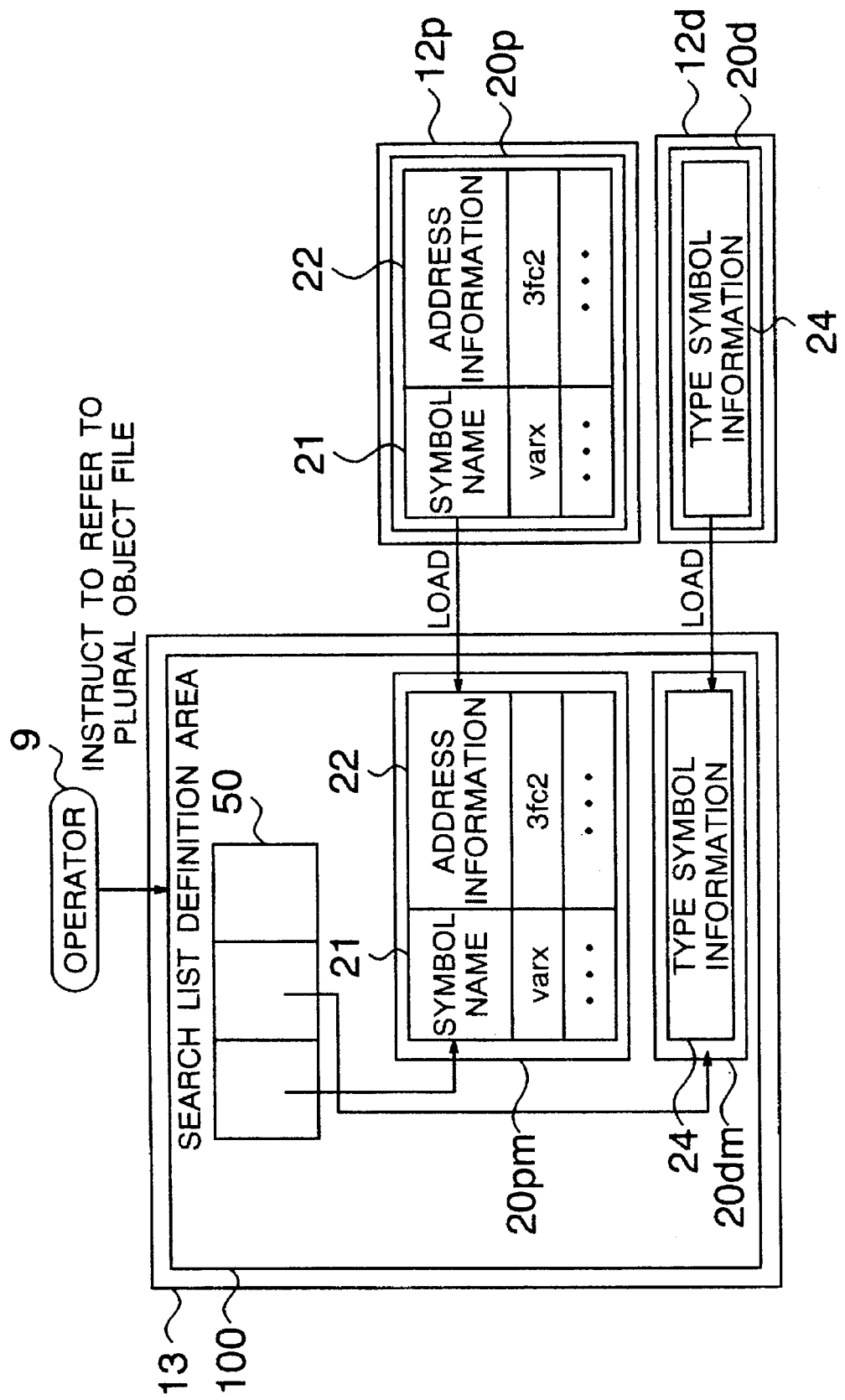
FIG. 5 is a conceptual diagram for indicating a debug information adding means according to one embodiment of the present invention.

FIG. 5 represents one embodiment of the debug information adding element 100, namely conceptually indicates a method for holding additional information in such cases that either the operator 9 designates the program object file 12p and the debug information object file 12d at the same time when the debugger is initiated, or the operator 9 additionally designates the debug information object file 12d with using a preselected debugger command. For instance, such a processing operation that both of the program object file 12p and the debug information object file 12d are simultaneously designated when the debugger is initiated, is carried out in accordance with flow operation defined in a flow chart of FIG. 6.

Figure 6:
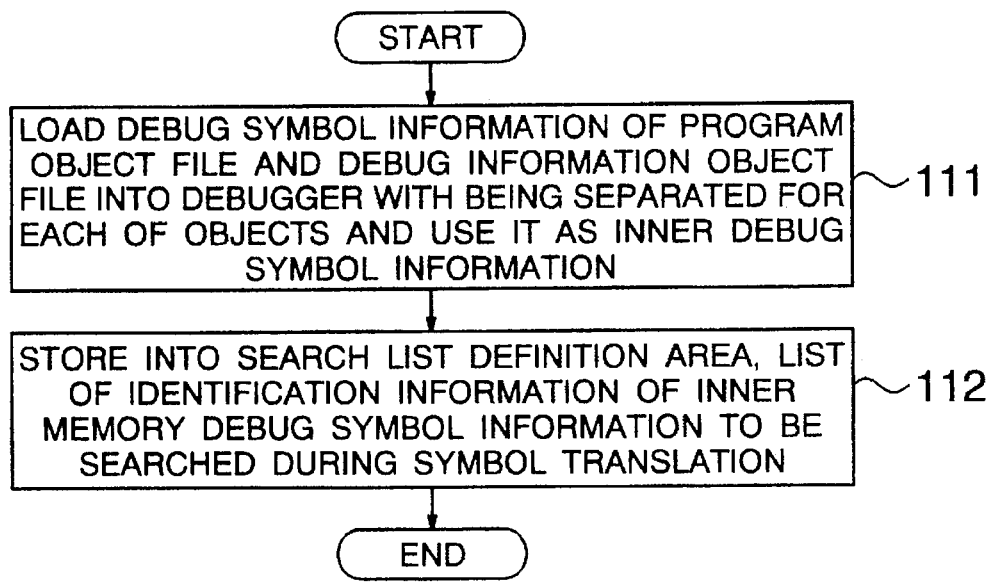
FIG. 6 is a flow chart for explaining one adding process effected by the debug information adding means of the present invention.

In the flow chart of FIG. 6, debugging symbol information 20p and 20d of a plurality of designated object files, namely the program object file 12p and the debug information object file 12d, are located in the tables provided in the debugger 13 which debugging symbol information stored in the object file is logically discriminatable by attaching the different names thereto, and then the discriminated debugging symbol information is loaded in the debugger 13 with being handled as debugger symbol information 20pm and 20dm within the memory (step 111). Subsequently, when the symbol designated by the operator 9 is translated into an address value and the like, a list of information used to discriminate the inner memory debugger symbol information 20pm and 20dm which have been loaded in a search list definition area 50 newly formed in the debugger 13 as such information used to which debug symbol information is searched (step 112).

Figure 7:
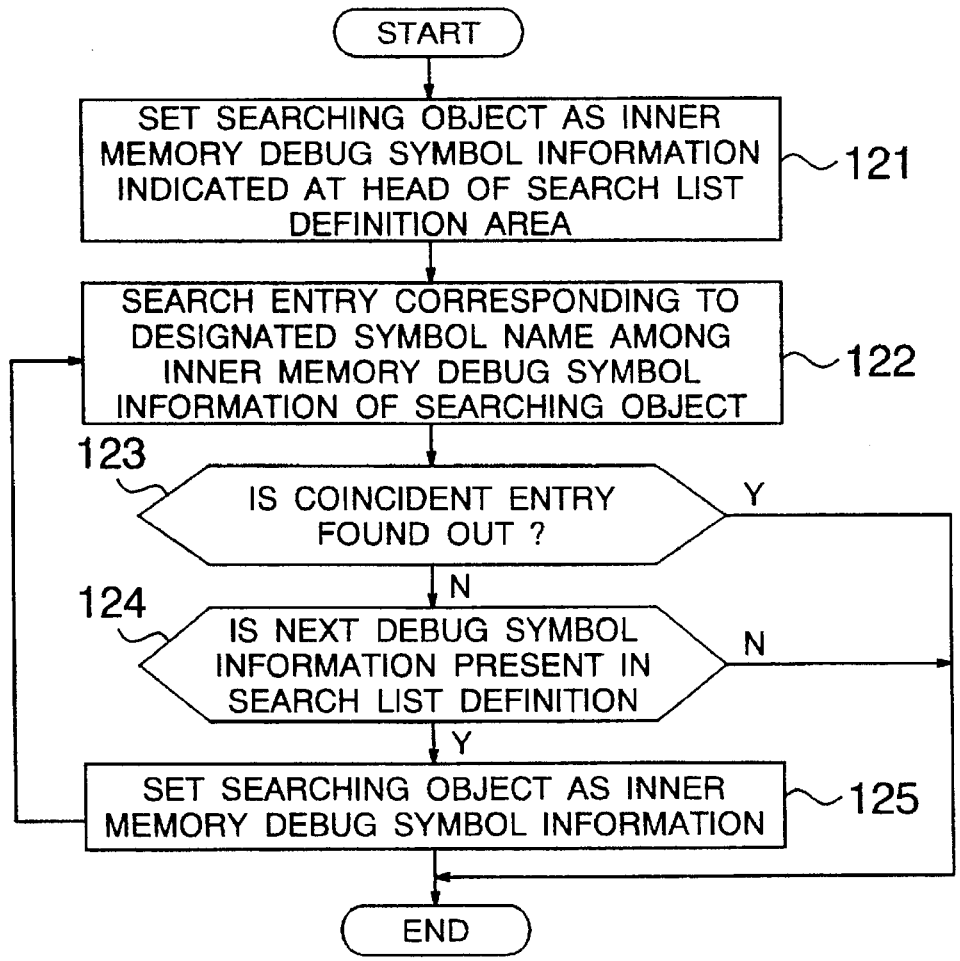
FIG. 7 is a flow chart for explaining a debug symbol information search effected by the debug information adding means according to the present invention.

A process operation for finding out a corresponding symbol information entry from a symbol name by using the information set by the above-explained process operations is carried out in accordance with a flow chart of FIG. 7.

In the flow chart of FIG. 7, based on the list information held in the search list definition area 50, a searching object is first recognized as debug symbol information located at a head portion of the list (step 121). Next, a search is made of such an entry which is coincident within the debug symbol information about this searching object (step 122). If the corresponding entry is found out, then the search processing operation is accomplished at this time (step 123). Conversely if the corresponding entry is not found out, then a check is done as to whether or not the next debug symbol information of the search list definition is present (step 124). When there is the next debug symbol information, this next debug symbol information is recognized as the searching object. Then, the processing operation is returned to the previous step 122 at which the above-explained operation is repeatedly executed (step 125). To the contrary, when there is no next debug symbol information, this processing operation is completed with such that no designated symbol information is present.

Figure 8:
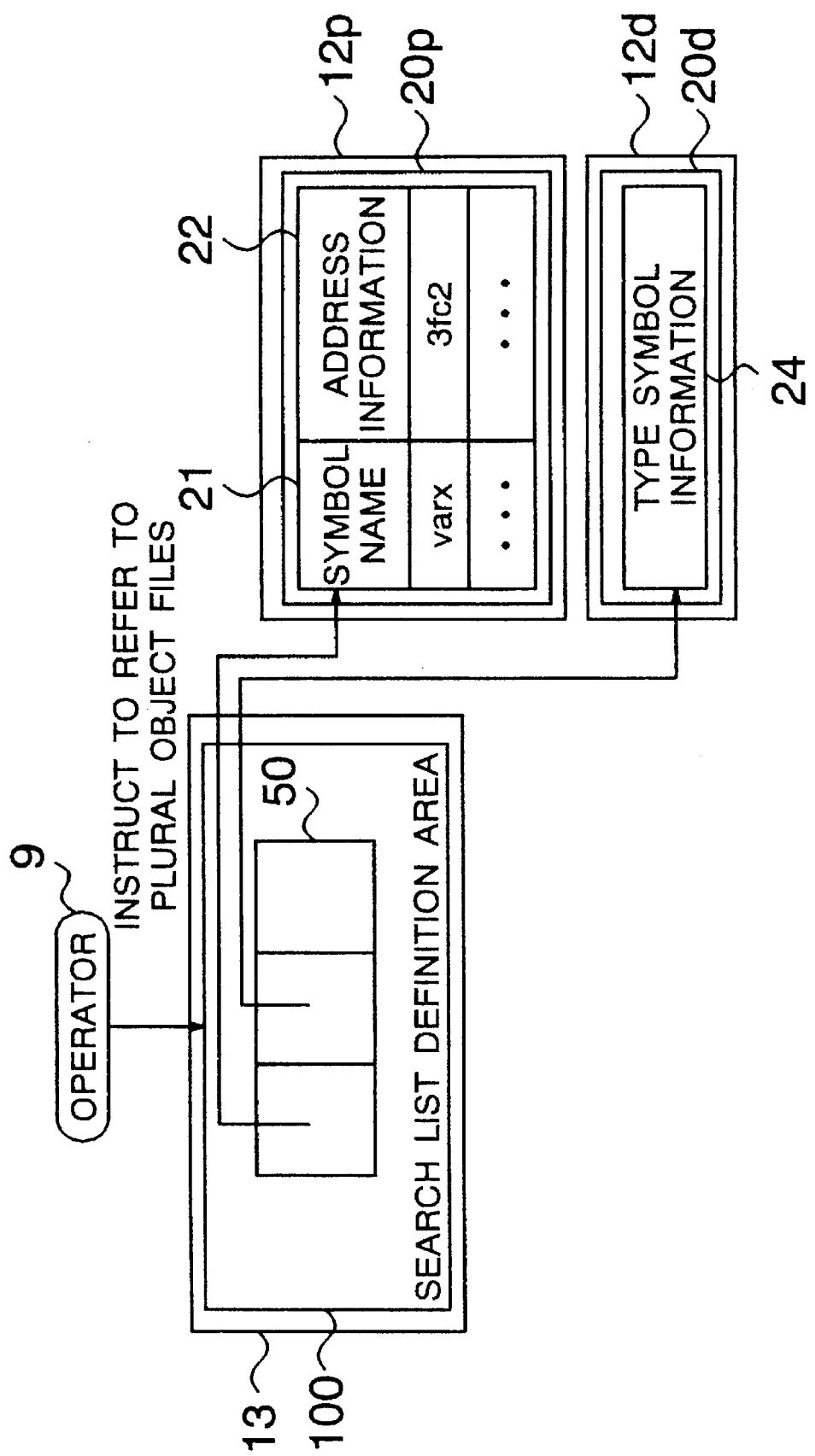
FIG. 8 is a conceptual diagram for representing a debug information adding means according to another embodiment of the present invention.

Although being theoretically identical to the above-described embodiment, such a method is conceivable as another embodiment. That is, as illustrated in FIG. 8, the overall debug symbol information is not load within the debugger. According to this method, while the debug symbol information 20p and 20d is left within the object files 12p and 12d, an identification information list about the object file names is stored in the search list definition area 50. When the debug symbol information is searched, the corresponding object file is directly searched in accordance with this search list.

Figure 9:
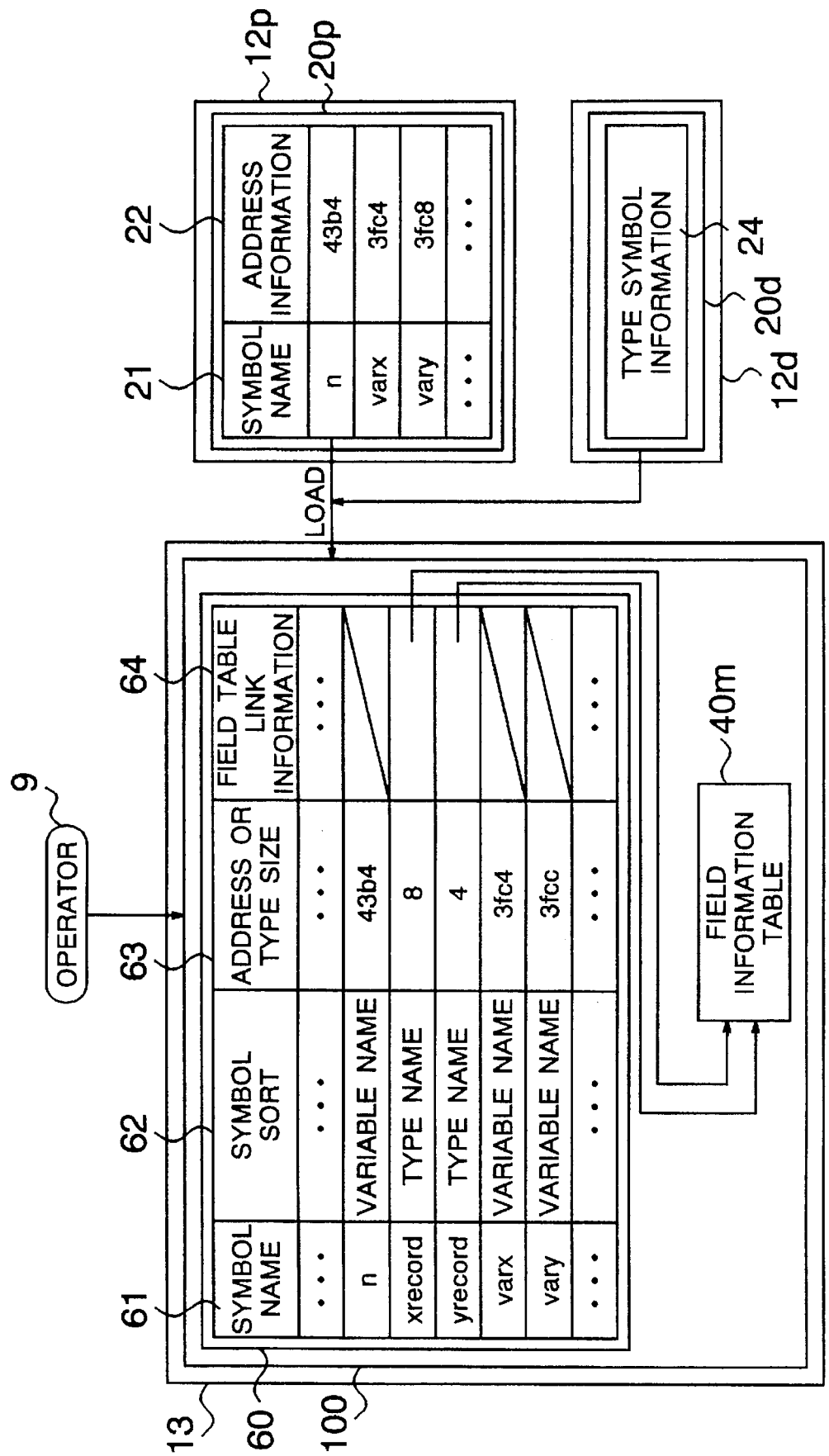
FIG. 9 is a conceptual diagram for indicating a debug information adding means according to a further embodiment of the present information.

As a further embodiment, such a method is conceivable that the two debug symbol information 20p and 20d is not separately loaded in logically different tables, both is mixed with each other to be loaded in a single table provided in the debugger. FIG. 9 represents an embodiment using this method.

A debug symbol information table 60 in which both of a symbol name 61 and a symbol sort 62 are utilized as a search key is provided in the debugger 13. Other fields of this debug symbol information table 60 are defined by a mixture form with the debug symbol information 20; and the debug symbol information 20d. These fields are constructed of an address/type size information field 63, a type field information field 64, and so on. The address/type size information field 63 holds either address information in case of a variable name or a function name of an information processing program, or a type size in case of a data type name. The type field information field 64 holds field information in case of the data type. A type field information table 40m provided within the memory, designated by the type field information field 64, corresponds to such a table that the type information table 40 (see FIG. 4) of the type symbol information 24 of the debug information object field 12d is loaded in the debugger 13.

Figure 10:
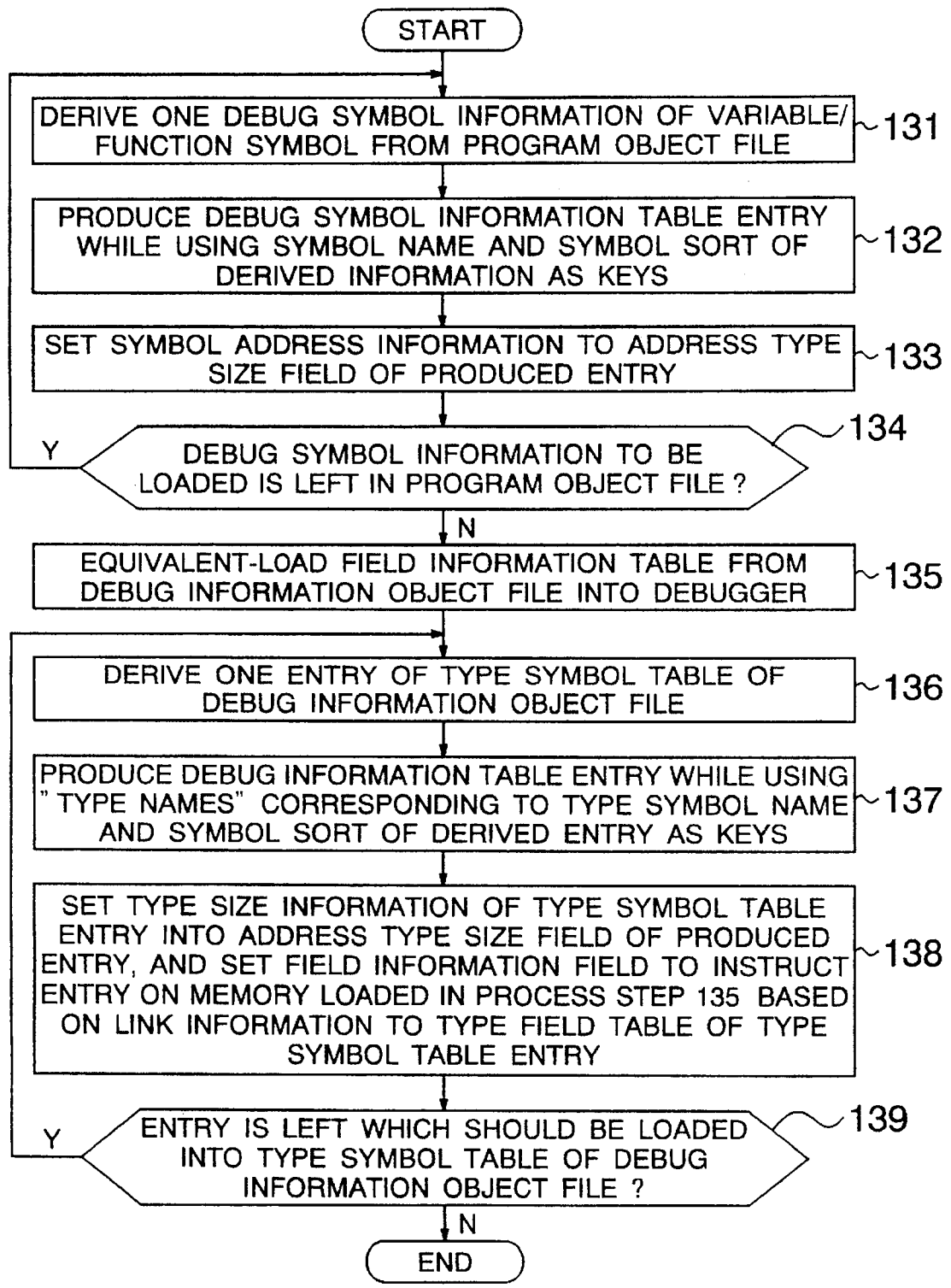
FIG. 10 is a flow chart for describing another adding process performed by the debug information adding means of FIG. 9 according to the present invention.

Next, a description will be made of the process operation to load the debug symbol information into these tables with reference to a flow chart shown in FIG. 10. The processing operation defined in FIG. 10 is mainly subdivided into two loading processes. A front half flow operation defined from a step 131 to a step 134 is such a process operation for loading the debug symbol information 20; into the program object file 12p, whereas a rear half flow operation defined from a step 135 to a step 139 is such a process operation for loading the debug symbol information 20d into the debug information object file 12d.

First, the below-mentioned process operation is executed in the front half flow operation. The symbol name information 21 and the address information 22 of the various variable as well as functions are retrieved from the program object file 12p (step 131). Subsequently, an entry of the debug symbol information table 60 is produced while using the symbol name of the retrieved information and the discriminating information about the variable name and function name as a key (step 132). The address information 22 corresponding to the remaining information is set to the address/type size information field 63 with respect to each of the produced entries (step 133). Finally, the above-described process operations defined from the step 131 to the step 132 are repeatedly performed until the entries of the debug symbol information 20p are ended (step 134). When all of the entries of this debug symbol information 20p are accomplished, the front half process operation is ended. It should be noted that the type field information field 64 is not used as the variable/function symbol of the program (indicated by an inclined line in the drawing).

When the front half process operation is completed, the rear half processing operation is performed, namely, a process to load the debug symbol information 20d from the debug information object file 12d is carried out.

First, the field information table 40 (see FIG. 4) in the type symbol information 24 of the debug information object field 12d is equivalently loaded in an inner memory field information table 40m provided within the debugger 13, namely is directly loaded therein without any modification (step 135). Next, the respective entries of the type symbol table 30 are derived (step 136). Then, an entry of the debug symbol information table 60 is produced while using as keys, both of the type symbol name of the derived entry and a "type name" corresponding to the symbol sort information (step 137). To the address/type size field 63 of the produced entry, the type size information 32 is set from the type symbol table 30, whereas based on the link information 33 to the type field information table, the link information is set to the type field information field 64 in such a manner that this link information designates the corresponding entry of the field information table 40m loaded at the step 135 (step 138). Finally, the above-explained process operation defined from the step 136 to the step 138 is repeatedly performed until the entries of the type symbol table 30 are ended (step 139). Then, when all of these entries are ended, this load process operation is accomplished.

When the debug symbol information 20p and 20d is loaded in the debugger 13 in accordance with the above-described manner, the debug symbol information as to the symbol name under operation by the operator can be simply searched, which is achieved by searching the debug information table 60 while using the symbol name and the sort of symbol as a key.

Although each of the debug symbol information cannot be mixed to be loaded into one table within the debugger in the embodiment of FIG. 9, when the methods according to the embodiments of FIG. 5 and FIG. 8 are utilized, the debug symbol information of both of the object files can be discriminated from each other. Accordingly, even when the debug symbol information entries having the same symbol names are contained in both of the object files, identifiers and names are added and the interfaces for designating the symbols are additionally provided, so that there is such an advantage that the debug symbol information of the desired object file can be used.

Next, an explanation will now be made of the data with type access instructing element 200 corresponding to one of the newly added element, according to an embodiment of the present invention.

Figure 11:
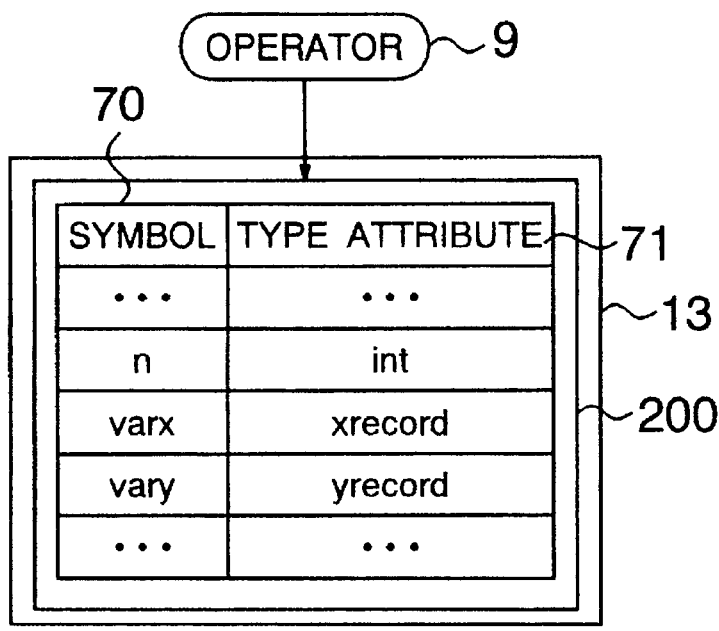
FIG. 11 is a conceptual diagram for representing a data access instructing means with a type according to one embodiment of the present invention.

FIG. 11 is a conceptual diagram for showing the data with type access instructing element 200 according to one embodiment. As previously explained, no data type information 23 of the respective function/ variable symbols is present in the program object file 12p which has not be formed by using the debug option. Therefore, such a method is employed that a type is set to a necessary function/variable symbol by way of an operation by an operator to the debugger 13.

Figure 12:
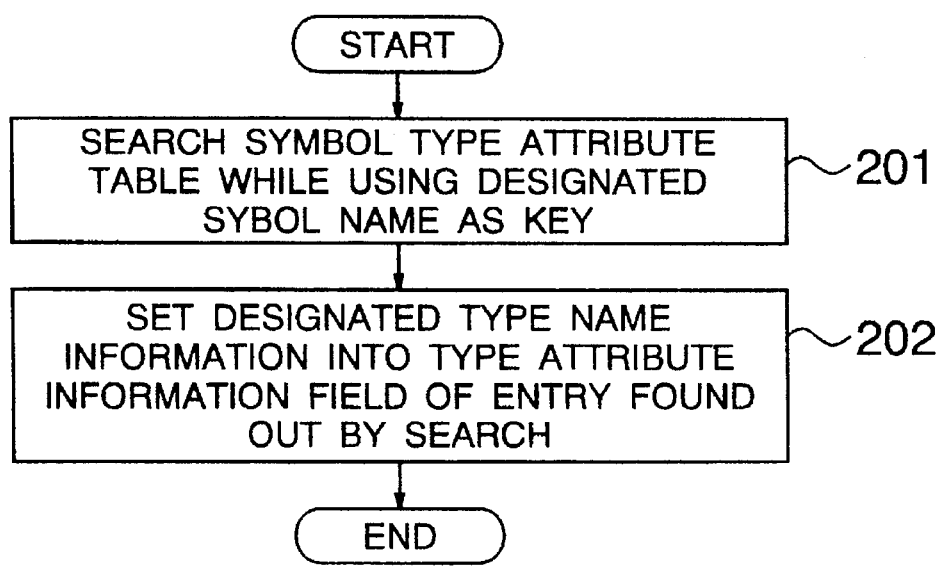
FIG. 12 is a flow chart for explaining operations of the data access instructing means with the type according to one embodiment of the present invention.

First, a symbol type attribute table 70 for stating such information indicative of data types of the various function/ variable symbols is prepared within the debugger 13, and such a default value as "int" corresponding to, e.g., a value indicative of 4-byte integer type is previously entered into a type attribute information field 71 of the respective function/ variable symbols. When a certain variable is wanted to be handled as a data type other than the default, the operator uses a predetermined debugger command and the like to designate a variable name and a type name desirably being set, so that setting of the data type of this variable is requested to the debugger 13. When the operator 9 performs, for instance, an operation to input "set-type varx xrecord", a type name "xrecord" is set to the type attribute information field 71 of the entry corresponding to the variable "varx" of the symbol type attribute table 70. This setting process operation is such a simple process operation as shown in a flow chart of FIG. 12. First, based on the designated variable name, the symbol type attribute table 70 is searched to find out the corresponding entry (step 201). Next, the designated type name and the like are set in the type attribute information field 71 of the found entry as a type attribute value (step 202) and then the process operation is completed. When the symbol type attribute table 70 can be set, all of such information required by the conventional debugger can be prepared, so that the symbolic debugging operation can be subsequently carried out in a manner similar to the conventional manner.

It should be noted that although the symbol type attribute information table 70 has been indicated in a table form in the embodiment of FIG. 11, this symbol type attribute information table may be realized as a portion of another table if the correspondence relationship with respect to the function/variable names of the information process program may be stated.

Figure 13:
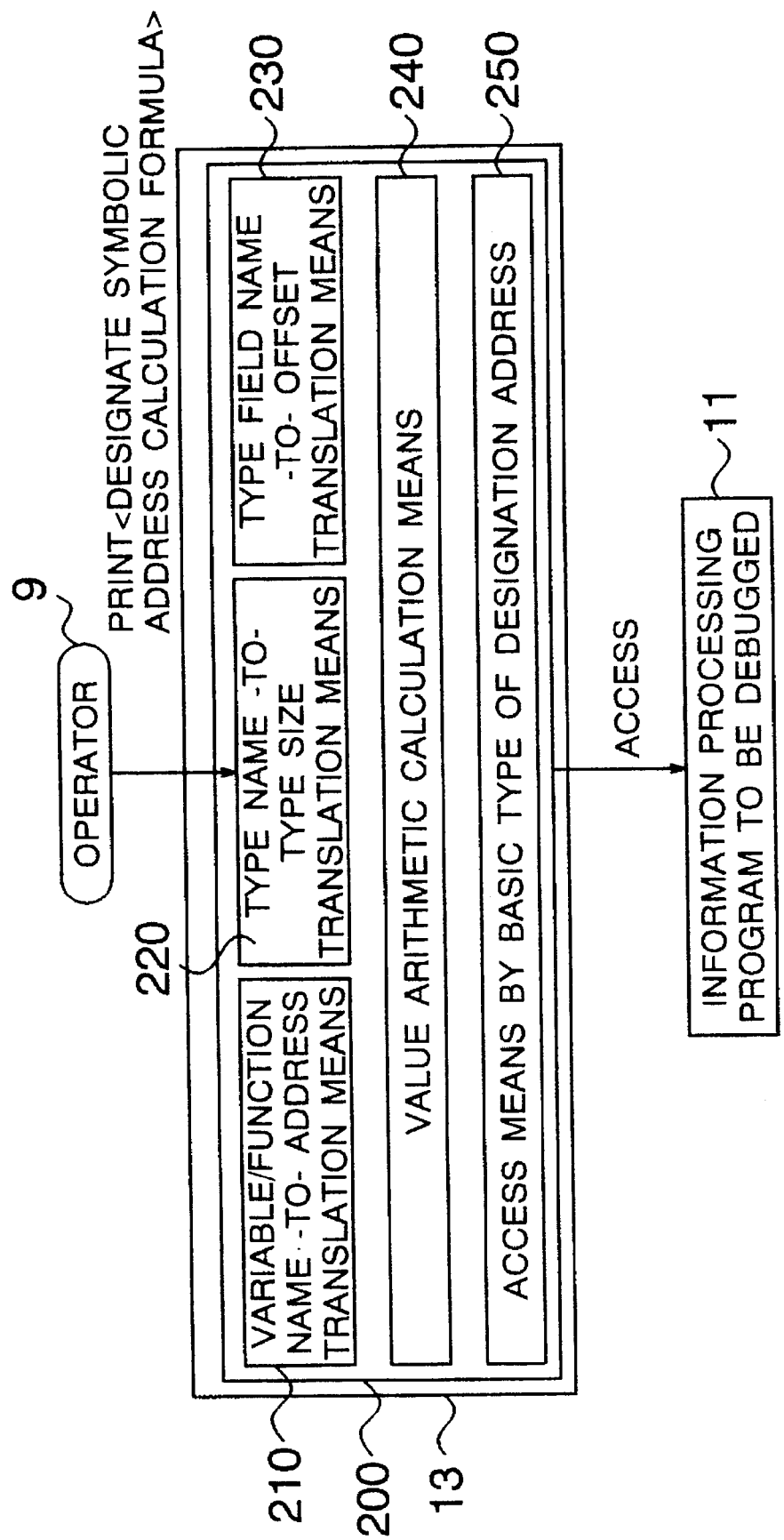
FIG. 13 is a conceptual diagram for showing another data access instructing means with a type according to a further embodiment of the present invention.

Another method as shown in FIG. 13 may be realized as another embodiment of the data with type access instructing means 200. In accordance with this method, the respective function/variable symbols do not completely own the data type attribute information, and the operator 9 symbolically designates the address to be desirably accessed in the form of calculation formula by combining the field names in case of such a type having the variable name, the type name, and the structure. Then, the variable and the like to be operated are symbolically accessed by using a command (for instance, a print command in the example of FIG. 13) for accessing the data of the obtained address. This method may be realized in the following manner.

First, in the debugger 13, there are prepared: a means 210 for translating a function/variable name of the information process program into an address corresponding thereto, a means 220 for translating a type name into a size value of this type name, and a means 230 for translating a field name of a structured type into an inner type offset value of this field. The above-described means can be readily realized when referring to the symbol name 21 and the address value information 22 of the debug symbol information 20p stored in the program object file 12p, and also to the type symbol information 24 of the debug symbol information 20d stored in the debug information object file 12d.

Figure 14:
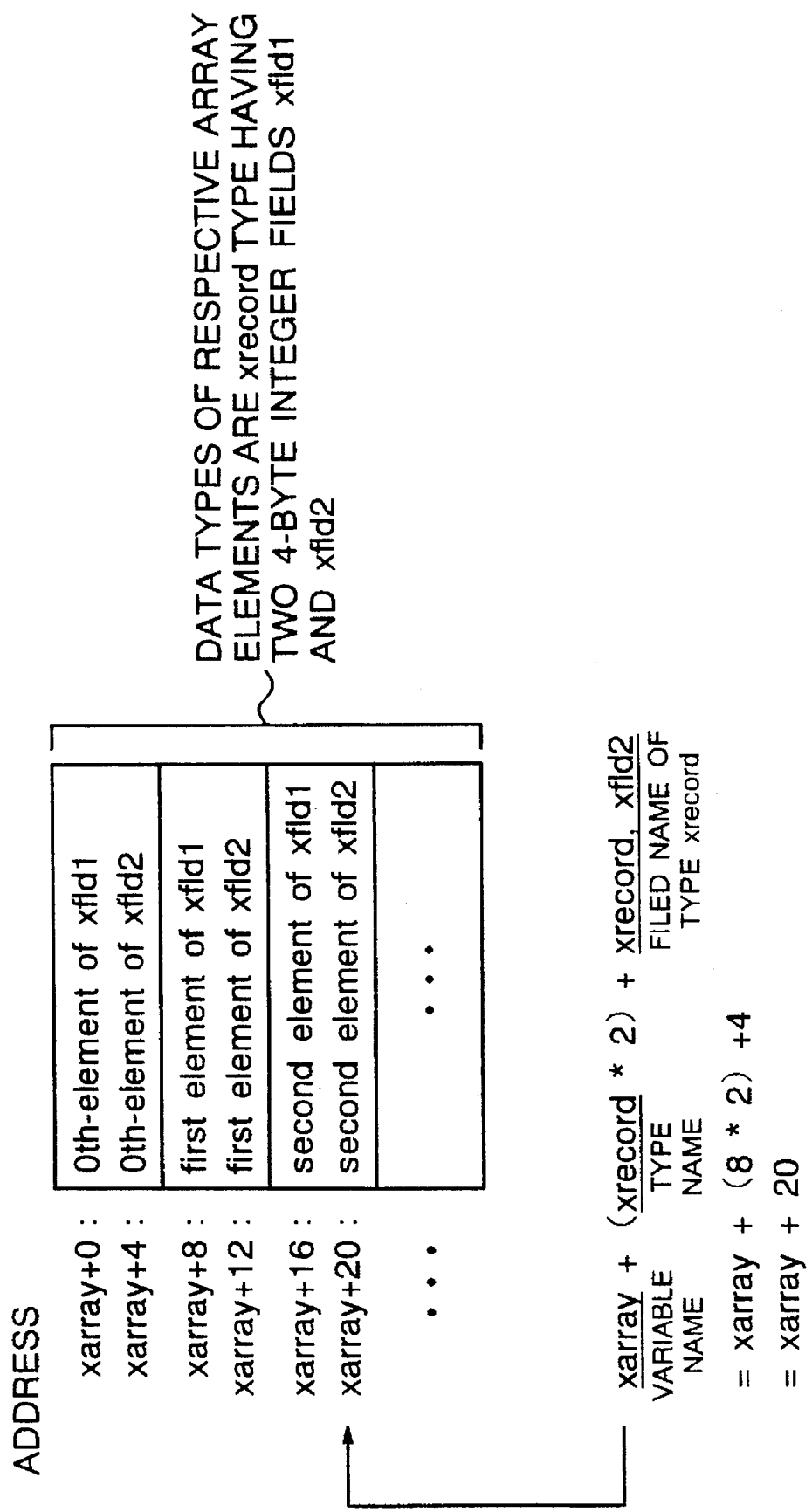
FIG. 14 schematically represents an access address instruction of the data access instructing means with the type.

Furthermore, since an arithmetical operation means 240 for a value is prepared for the debugger 13, even when a variable has a structure, such an address to be finally accessed may be described, or stated in a calculation form by using a variable symbol name, a type symbol name, and a type field name. In an example shown in FIG. 14, for instance, an address of an xfld2 field of a second element in such an array variable "xarray" can be designated by the following formula:

"xarray+(xrecord*2)+xrecord.xfld2"

In the array variable "xarray", a type "xrecord" having a structure constituted by two sets of 4-byte integer fields called as "xfld1" and "xfld2" is provided as each element. In this case, since the array variable "xarray" is translated into an address of "xarray", this array variable "xarray" is translated into "8" equal to the type size of "xarray", and further "xrecord.xfld1" is translated into "4" equal to the offset value of this field name, it becomes "xarray+20" as the value of this formula, so that a desired address can be obtained.

Since the symbolic address of the data wanted to be accessed by the above-described means can be designated, a means 205 for accessing to the designated address with such limited basic data types as a 4-byte integer and an 8-byte floating point is supported, so that an access to such a variable having an arbitrary data type of the information process program 11 to be debugged can be symbolically designated.

According to the present invention, even when the information processing program to be debugged is not formed by a specific debug option, symbolic debugging can be achieved. In other words, there is such an effect that even such a practical information process program which has not been formed for debugging purposes can be symbolically debugged without any modification.

What is claimed is:

1. An information processing debugging apparatus for debugging an information processing program, comprising:

a processor for processing data in accordance with instructions of said information processing program;

a memory connected to said processor, said memory includes a debugger, said information processing program and a plurality of functions for debugging said information processing program; and a disk storage connected to said memory and said processor, said disk storage includes a program object file containing an executable object program corresponding to said information processing program, a symbol name and address information, said program object file, said symbol and said address information being referred to by said debugger;

wherein said debugger includes debug information adding means for generating data type symbol information for debugging said information processing program and storing said data type symbol information in said disk storage;

wherein said disk storage includes a debug information object file containing said data type symbol information for debugging said information processing program by symbolically accessing data by use of said data type symbol information; and wherein said debugger further includes data access instructing means for instructing an access to said information processing program during debugging operation of said information processing program with reference to said symbol name of said information processing program and said data type symbol information thereof.

2. An information processing debugging apparatus as claimed in claim 1 wherein:

said access instructing means of said debugger includes a table containing a correspondence relationship between a plurality of symbol names and a plurality of symbol information.

3. An information processing debugging apparatus as claimed in claim 1 wherein said information processing debugging apparatus includes a terminal unit for transferring to said debugger an instruction concerning a symbol name and symbol information issued from an operator;

wherein said access instructing means of said debugger sets data type attribute information to said table in response to the symbol name and the data type name entered via said terminal unit, said data type attribute information corresponding to said symbol name and said data type name.

4. An information processing debugging apparatus as claimed in claim 1 wherein:

said access instructing means includes:

means for translating the data type name stored within said table into a size of the data type to be stored into said table;

means for translating a field of a data type into an offset value of a data type to be stored into said table; and means for translating the symbol name in the information process program into an address value corresponding thereto.

5. An information processing debugging apparatus as claimed in claim 4 wherein:

said access instructing means includes address access means for calculating said size of the data type, said offset value, and said address value, thereby obtaining an address used to access said information process program.

6. An information processing debugging system as claimed in claim 4, wherein the data access instructing function in the debugger program includes a data access function which accesses data in the information processing programs in the memory by calculating its data size with the translated type size value of the data, and its data address with the translated variable's loaded address value and the structural offset value.

7. An information processing debugging system as claimed in claim 1, wherein the data access instructing function in the debugger program includes a translation function which, referring to the data type symbol information in the debug object information files and the symbol name and address information in the program object files, translates a data type name specified by an operator into a size value of the data type, translates a field name of a structural data type into an offset value in the structural data type, and translates a symbolic variable name in the information processing programs into a loaded address value of the variable.

8. In an information processing debugging apparatus including a processor, a memory having a debugger, and a disk storage having a file, a method for obtaining debug symbol information within an information processing program compiled using a compile option but without using a debug option, comprising:

a file preparing step for preparing within said disk storage a program object file containing an executable object program corresponding to the information processing program and preparing within said memory a symbol name and address information, said program object file, said symbol name and said address information being referred to by said debugger;

a symbol information preparing step for holding data type symbol information used to debug said information processing program in at least one debug information object file prepared within said disk storage; and an access instructing step for referring to said symbol name and said data type symbol information of the information processing program and for instructing an access to said information process program during debugging operation of said object program.

9. A method as claimed in claim 8 further comprising:

a file designating step for designating one debug information object file and said program object file in a combination with each other; and a debug step for executing a symbolic debugging operation to symbol information within said information processing program while said information processing program is debugged by said debugger.

10. A method as claimed in claim 8 further comprising:

a step for providing within said debugger, a table containing a correspondence relationship between a plurality of symbol names and a plurality of symbol information within said information processing program.

11. A method as claimed in claim 8 further comprising:

a library file preparing step for preparing said information processing program and a file for a library to be merged in said disk storage.

12. A method as claimed in claim 6 further comprising:

a step for applying entries with respect to said plurality of symbol information contained in said table and giving a list indicative of a sequence along which symbols are referred, whereby:

a symbol name corresponding to one referred symbol of said symbol information is employed to carry out said debugging operation.

13. A method, as claimed in claim 8, further comprising:

a debug information file designation step where each debug object information file is specified to be associated with respective program object files; and a debug step where symbolic debug operations for accessing data in an information processing program in the memory are performed selectively using the information in a program object file corresponding to the information processing program being debugged and in debug object information files associated with the program object file specified in the debug information file designation step.

14. A method as claimed in claim 8, further comprising:

a symbol attribute setting step where, referring to the symbol name and address information in the program object files and the data type symbol information in the debug object information files, a table, within the debugger program, which describes a corresponding relationship between symbolic variable names of the at least one information processing program and attribute information for their loaded addresses and their data types is set by instruction of an operator.

15. A method as claimed in claim 8, further comprising:

a library file preparation step where object program files of libraries, which are used by the at least one information processing program but are not included in the object program files of the at least one information processing program, are made and stored in the disk storage as the object program files of the at least one information processing program are done.

16. A method as claimed in claim 8, further comprising:

another symbol attribute setting step for symbols in the libraries where, referring to the symbol name and address information in the program object files of the libraries, and the data type symbol information in the debug object information files, a table, within the debugger program, which describes a corresponding relationship between symbolic variable names of the libraries and attribute information for their loaded addresses and their data types, is set by instruction of an operator.

17. An information processing debugging system, which provides a debugging function for examining data and controlling execution of at least one information processing program to be debugged, comprising:

a processor which executes instructions of a debugger program which performs the debugging function, and instructions of the at least one information processing program and their libraries which both are under control of the debugger program; and a memory, connected to the processor, which holds programs and data, to be executed by the processor or accessed by the processor following instructions of the programs, the at least one information processing program, libraries called from the at least one information processing program, and the debugger program; and a disk storage, connected to the memory and the processor, which holds program object files containing, in additional to executable object program images of the information processing programs loaded in the memory, symbol and address information which describes an association between symbolic names, for variables and functions in the information processing programs, and their loading addresses;

wherein said debugger program includes a debug information adding function to add and store, as at least one debug information object file in the disk storage, data type symbol information which describes symbolic names and attributes of types, such as size and offset of structural fields of the types, being used in the at least one information processing program and to be used for the debugger program to symbolically access data in the at least one information processing program in the memory; and wherein said disk storage holds the added at least one debug information object file; and wherein said debugger program further includes a data access instructing function for an operator to instruct the debugger program to access data of a variable in the at least one information processing program in the memory as if the variable specified by a symbolic variable name has a specific data type specified by a symbolic type name.

18. An information processing debugging system as claimed in claim 17, wherein the data access instructing function in the debugger program has a table describing a corresponding relationship between symbolic variable names of the information processing programs and attribute information for their loaded addresses and their data types.

19. An information processing debugging system as claimed in claim 18, wherein the information processing debugging system includes a terminal unit for an operator to instruct the debugger program; and wherein the data access instructing function in the debugger program includes the data type attribute setting function which, referring to the symbol name and address information in the program object files and the data type symbol information in the debug object information files, sets entries of the table with pairs of a symbolic variable name and its data type name specified by the operator through the terminal unit.

20. In an information processing debugging system, which provides debugging function for examining data and controlling execution of at least one information processing program to be debugged, including a processor, which executes instructions of a debugger program, said at least one information processing program to be debugged and libraries to be used by the information processing programs a memory, which holds programs and data for the debugger program, the at least one information processing program and libraries used by the information processing programs, and a disk storage which holds files, a method for making symbolic debugging of the information processing programs comprising:

a program object file preparation step where, in order to create an ordinary program object files of the at least one information program which only include executable program object images and symbol name and address information which describes association between symbolic names, for variables and functions in the information processing programs, and their loading addresses, source programs of the at least one information processing programs are compiled without any special compile option for symbolic debugging and the created program object files are stored in the disk storage;

a debug information addition step where data type symbol information, which describes symbolic names and attributes of types, such as size and offset of structural fields of the types, being used in the at least one information processing program and to be used for the debugger program to symbolically access data in the information processing program in the memory, is made and stored in the disk storage as one or a plurality of debug information object files; and a data access instruction step where an operator instructs the debugger program to access data of a variable in the at least one information processing program in the memory as if the variable specified by a symbolic variable name has a specific data type specified by a symbolic type name.

* * * * *